No. 887,547. PATENTED MAY 12, 1908.
C. B. TRUMBLE.
TRAP.
APPLICATION FILED MAY 9, 1907.
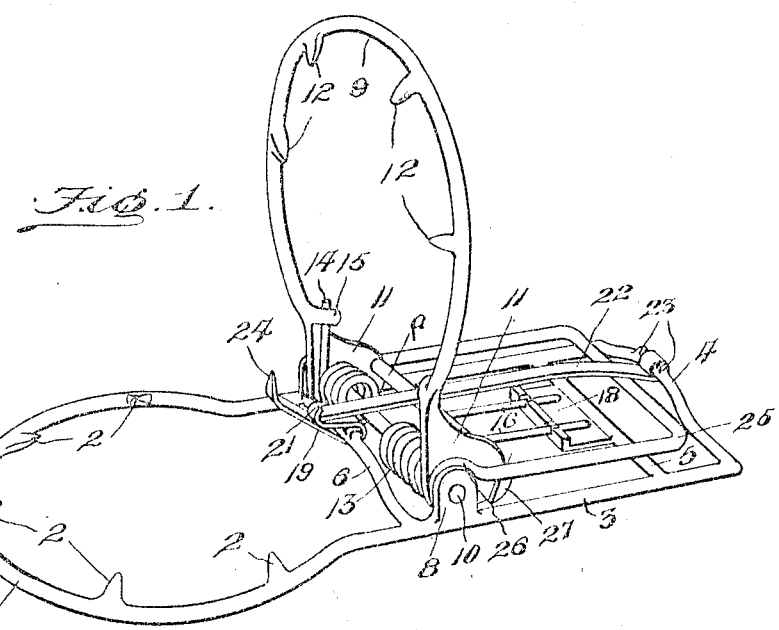
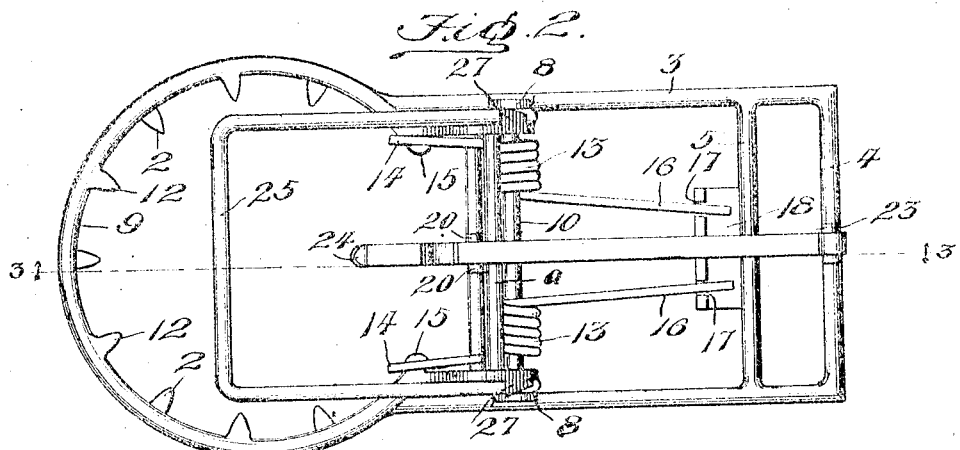
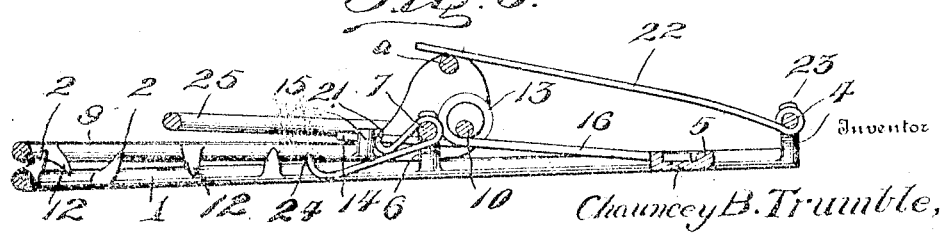
Inventor
Chauncey B. Trumble,
by Victor J. Evans
Attorney
Witnesses
J. L. Wright

UNITED STATES PATENT OFFICE.

CHAUNCEY B. TRUMBLE, OF SYRACUSE, NEW YORK, ASSIGNOR TO JUDSON M. CHENEY, OF CAZENOVIA, NEW YORK.

TRAP.

No. 887,547.  Specification of Letters Patent.  Patented May 12, 1908.

Application filed May 9, 1907. Serial No. 372,753.

*To all whom it may concern:*

Be it known that I, CHAUNCEY B. TRUMBLE, a citizen of the United States, residing at Syracuse, in the county of Onondaga and State of New York, have invented new and useful Improvements in Traps, of which the following is a specification.

This invention relates to spring jaw traps, and one of the principal objects of the same is to provide a trap of this character which shall be comparatively simple in construction, and in which the teeth on the jaws of the trap extend inwardly and backwardly to prevent the animal from withdrawing from the trap after it has been sprung.

Another object of the invention is to provide two springs for closing the jaws of the trap, and means whereby one of said springs may be readily disconnected to decrease the power of the spring action of the jaws, whenever the trap is required for use in catching smaller animals.

Still another object of the invention is to provide a spring jaw trap which can be readily set without danger of injury to the hands of the user.

These and other objects may be attained by means of the construction illustrated in the accompanying drawing, in which:

Figure 1 is a perspective view of a trap made in accordance with my invention, the trap being shown set. Fig. 2 is a plan view of the same, the trap being shown sprung. Fig. 3 is a longitudinal section on the line 3—3, Fig. 2, looking in the direction indicated by the arrows.

Referring to the drawing for a more particular description of my invention, the numeral 1 designates the lower jaw of the trap comprising a loop or ring having inwardly and upwardly projecting points or prongs 2, and a rearwardly extending base portion 3 of substantially rectangular formation, said base portion having a rear cross bar 4, a cross bar 5 and a front cross bar 6 having a curved central portion 7. Oppositely disposed lugs 8 are formed on the base portion, and the upper jaw 9 is connected to the lugs 8 by means of a pin 10 which extends through the lugs 8 and through the enlarged lugs 11 on the lower ends of the jaw 9. Downwardly and inwardly extending prongs 12 are provided on the jaw 9. A pair of coiled springs 13 surround the pintle 10, the front ends 14 of the springs engaging lugs 15 projecting inward from the jaw member 9, and the rear ends 16 of said springs being seated in notches 17 in a centrally disposed support 18 formed upon the cross bar 5.

Loosely mounted on the curved portion 7 of the cross bar 6 is a trigger and bait point 19, said trigger being mounted between spaced lugs 20 and provided with an upturned lip 21 adapted to engage the front end of a trigger 22 pivotally connected to the rear cross bar 4 between the lugs 23. The bait point 24 is extended some distance above the lip 21, as shown in Fig. 1 of the drawing. A bail 25 has its ends 26 bent around the pintle 10 inside the lugs 8, said bail being thus pivoted to the pintle 10. Formed on the enlarged lugs 11 of the upper jaw 9 are projections 27, which are engaged by the parallel arms of the bail 25 to raise the jaw 9 against the tension of the springs 13 until the trigger 22 is extended over the bail and connected with the lip 21 of the bait trigger.

In setting the trap the bail 25 is drawn backward, said bail engaging the projections 27 on the jaw 9. When the bail 25 has been pressed down sufficiently to permit the trigger 22 to extend over the same and engage the lip 21, the trap is set, this operation being performed from within the upper jaw 9 without danger of injury to the hands. It is to be understood, of course, that the point 24 is baited before the trap is set. Should it be desired to use the trap for smaller animals not requiring a stiff spring action, one of the springs 13 may be disconnected by raising the end 16 out of the notch 17, and thus relieving the end 14 from the projecting lugs 15 on the jaw 9.

From the foregoing it will be obvious that a trap made in accordance with my invention, is comparatively simple in construction; that the tension of the spring may be regulated; that the trap may be set without danger of injury to the user; and that the rearwardly projecting prongs on the jaws will not permit the withdrawal of the animal after the trap has been sprung.

Having thus described the invention, what I claim is:

A spring jaw trap comprising a lower jaw having a base portion extending backwardly therefrom, a pintle, an upper jaw pivotally connected to the lower jaw by said pintle, springs connected to said pintle and provided with oppositely extending ends, lugs on the upper jaw the front ends of said springs being connected to said lugs, a support on the base portion, and the opposite ends being seated in said support, whereby either of said springs may be disconnected for the purpose described.

In testimony whereof, I affix my signature in presence of two witnesses.

CHAUNCEY B. TRUMBLE.

Witnesses:
E. C. WRIGHT,
WESLEY HOOK.